(12) United States Patent
Spears et al.

(10) Patent No.: US 8,982,261 B2
(45) Date of Patent: Mar. 17, 2015

(54) IMAGING WITH INTERLEAVED DETECTION ACCUMULATIONS

(71) Applicant: Hewlett-Packard Development Company, L.P., Houston, TX (US)

(72) Inventors: Kurt Eugene Spears, Fort Collins, CO (US); Otto K Sievert, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/651,387

(22) Filed: Oct. 13, 2012

(65) Prior Publication Data

US 2014/0104463 A1     Apr. 17, 2014

(51) Int. Cl.
| | |
|---|---|
| *H04N 3/14* | (2006.01) |
| *G06F 3/0354* | (2013.01) |
| *G06F 3/042* | (2006.01) |
| *H04N 5/33* | (2006.01) |

(52) U.S. Cl.
CPC ........ *G06F 3/03542* (2013.01); *G06F 3/03545* (2013.01); *G06F 3/042* (2013.01)
USPC ...... 348/308; 348/164; 348/207.99; 348/273; 348/297; 250/208.1

(58) Field of Classification Search
USPC .......................................... 348/273, 308, 370
See application file for complete search history.

(56) References Cited

U.S. PATENT DOCUMENTS

| | | | |
|---|---|---|---|
| 7,023,536 B2 | 4/2006 | Zhang et al. | |
| 7,038,846 B2 | 5/2006 | Mandella | |
| 7,088,440 B2 | 8/2006 | Buermann et al. | |
| 7,098,952 B2 * | 8/2006 | Morris et al. | 348/308 |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,349,104 B2 * | 3/2008 | Geng | 356/603 |
| 7,460,160 B2 | 12/2008 | Hershey et al. | |
| 7,474,809 B2 | 1/2009 | Carl et al. | |
| 7,586,074 B2 * | 9/2009 | Gulbransen et al. | 250/208.1 |
| 7,697,051 B2 * | 4/2010 | Krymski | 348/308 |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 8,102,435 B2 * | 1/2012 | Castorina et al. | 348/222.1 |
| 8,139,055 B2 | 3/2012 | Brown | |
| 8,558,929 B2 * | 10/2013 | Tredwell | 348/294 |
| 2005/0168437 A1 | 8/2005 | Carl et al. | |

(Continued)

OTHER PUBLICATIONS

Kawada, S. et al.; A Wide Dynamic Range Checkered-color CMOS Image Sensor with IR-cut RGB and Visible-to-near-IR Pixels; http://ieeexplore.ieee.org/xpl/login.jsp?tp=&arnumber.

(Continued)

*Primary Examiner* — Ngoc-Yen Vu
(74) *Attorney, Agent, or Firm* — Clifton L. Anderson

(57) ABSTRACT

An imaging system includes a sensor array of sensor elements to convert incident light to detections. Plural detection accumulators are provided to store detections. Switches alternatively route detections from a sensor element selectively to n≥3 members of a set of said detection accumulators. An imaging process includes converting incident light to detections, and routing detections so as to partition them among n≥3 accumulators.

20 Claims, 4 Drawing Sheets

(56) References Cited

U.S. PATENT DOCUMENTS

| | | | |
|---|---|---|---|
| 2007/0211013 A1 | 9/2007 | Uehara et al. | |
| 2008/0285056 A1* | 11/2008 | Blayvas | 356/603 |
| 2010/0289885 A1 | 11/2010 | Lu et al. | |
| 2011/0227915 A1 | 9/2011 | Mandella et al. | |
| 2011/0279414 A1 | 11/2011 | Noma et al. | |
| 2012/0038549 A1 | 2/2012 | Mandella et al. | |
| 2013/0027596 A1* | 1/2013 | Wan | 348/302 |
| 2013/0194418 A1 | 8/2013 | Gonzalez-Banos et al. | |
| 2014/0104464 A1* | 4/2014 | Spears | 348/272 |

OTHER PUBLICATIONS

Gao. Rui et al; Microsoft Research-Mobile Surface; Microsoft Research; 2010; http://research.microsoft.com/en-us/projects/mobilesurface/.

Hand, Randall; Infinite Z Launches zSpace Virtual Holographic 3D Display Designers; VizWorld.com; Dec. 13, 2011: http://www.vizworld.com/2011/12/infinite-launches-zspace-virtual-holographic-3d-display-designers/#sthash.j6Ysf31PX.dpbs.

Harrison, Beverly & Ziola, Ryder; Bringing Toys To Life: Intel Labs OASIS Project; Agumented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; USIT'11; Oct. 16, 2011; Santa Barbara, California; http://research.microsoft.com/en-us/um/people/awilson/publications/HarrisonUIST2011/HarrisonUIST2011.html.

Hartmann. Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.

Hinckley, Ken et al; Pen +Touch =New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://firesearch.microsoft.com/pubs/132551/cslatel.pdf.

Junuzovic, Sasa et al; Microsoft Research-IllumiShare; Microsoft Research; 2012; http://delivery.acm.org/10.1145/2210000/2208333/p1919-junuzovic.pdf?ip=15.219.153.76&id=2208333&acc=ACTIVE%20SERVICE&key=C2716FEBFA981EF153FE223D54A46A411F9E1F05F1DA6F38&CIFD=27 1558808&CFTOKEN=96334302&_acm_=1387226323_00af7aa5e159c7c67d724c49ef01back.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder; Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point Interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.technologyreview.com/news/419639/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publication/WilsonUIST2010/WisonUIST2010.html.

Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

IMAGING WITH INTERLEAVED DETECTION ACCUMULATIONS

BACKGROUND

In a virtual-object collaborative environment, remote collaborators can interact with and modify a shared virtual object. The shared virtual object can be in the form of visible images, instances of which are presented locally to respective collaborators. Interactions with the virtual object can be effected using human input devices. For example, the virtual object can be a virtual document page; a collaborator can annotate the virtual document page using an IR pen (a stylus with a tip that emits infra-red light). The annotations can then be presented to remote collaborators. In other words, the images of the document pages at the different locations can be reconciled to the effect that they all represent the same object.

BRIEF DESCRIPTION OF THE DRAWINGS

The following figures represent examples and not the invention itself.

DETAILED DESCRIPTION

PCT Patent Application number PCT/US11/58896 filed 2011 Nov. 2 and entitled "Projection Capture System, Programming And Method" discloses a virtual-object collaborative environment (e.g., a mixed reality system) with respective imaging systems provided for each collaborator. Each imaging system includes a projector for projecting a visible image representing a virtual object, e.g., a document page. Each imaging system includes a visible-light camera to track changes in the virtual object, e.g., due to actions by the local collaborator using an IR pen. To this end, an IR camera is used to track the position and motion of the IR pen.

Such a system must address the challenge of color registration. First of all, the images taken by the IR camera must be aligned (registered) with the visible light image. Furthermore, if the visible-light camera uses separate sensor elements for color components (e.g., red, green, and blue) of the visible light, the resulting monochrome images must be registered to avoid undesirable artifacts in the composite image. Calibration and post-processing procedures may be available to address registration problems, but they can incur undesirable penalties in time and processing power. For example, the post-processing can increase the latency required to update a projected visible image based on a captured digital image.

Examples disclosed herein address registration challenges in part by using full-range sensor elements to capture all colors, albeit at different times. As explained below with respect to imaging system 100 (FIG. 1), detections output by each sensor element are routed to at least three different color-dedicated accumulators as a function of time so that each accumulator accumulates detections for a respective color. As explained further below with reference to collaborative environment 300 (FIGS. 3 and 4), the inclusion of an accumulator dedicated to IR detections addresses the problem of registration of the IR light to the visible light and provides for interleaving of the accumulations to minimize time-based registration problems even in the case of scenes with moving elements, e.g., a moving IR pen.

Figure 1:
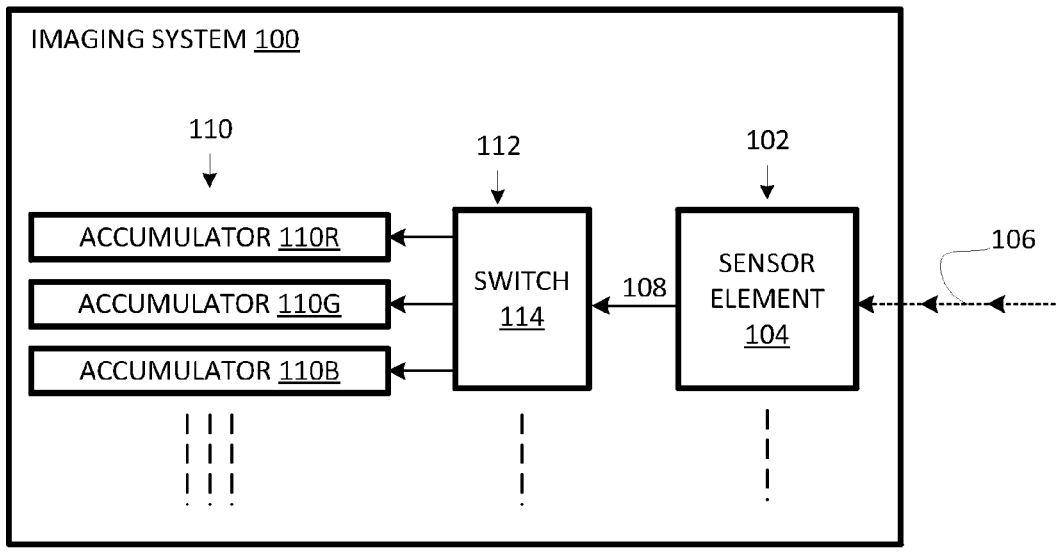
FIG. 1 is a schematic diagram of an imaging system in accordance with an example.

An imaging system 100, shown in FIG. 1, includes a sensor array 102 of sensor elements 104. Each sensor element 104 is to convert incident light 106 to detections 108. Depending on the type of technology employed, detections 108 may take the form of electric charges or some other form.

In addition to sensor elements 104, imaging system 100 includes detection accumulators 110. Associated with each sensor element 104 is a set of n detection accumulators, where n is an integer greater than or equal to three (n≥3) so that, for example, at least a first detection accumulator 110R can be dedicated to accumulating detections of red light, at least a second detection accumulator 110G can be dedicated to accumulating detections of green light, and at least a third detection accumulator 110B can be dedicated to detections of blue light. Alternatively, each of three or more detection accumulators can be dedicated to a respective dimension of a color space other than red-green-blue (RGB). Imaging system 100 further includes a switch set 112 of switches 114. Each switch 114 is to route detections from a sensor element 104 to detection accumulators 110 as a function of the color of the incident light being converted to the detections.

Figure 2:
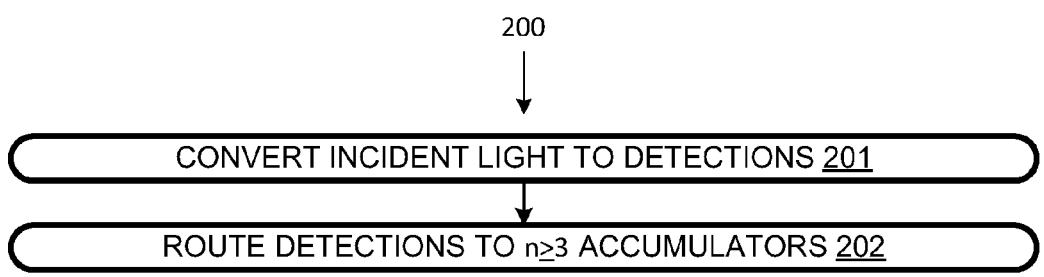
FIG. 2 is a flow chart of a process in accordance with an example.

An imaging process 200 that can be implemented using imaging system 100 or another imaging system is flow charted in FIG. 2. At 201, incident light (e.g., incident a sensor element 104) is converted to detections. At 202, the detections are routed (e.g., by switch set 114) to "color-dedicated" detection accumulators 100 as a function of the color of the incident light being converted to the detections.

The use of plural color-dedicated accumulators advantageously decouples the process of inputting detection to the accumulators from the process of outputting accumulations from accumulators. If only one accumulator is used for plural colors, the accumulator must be read out and reset whenever the color to be detected is changed. When plural dedicated-color accumulators are used, one color can be read while another is accumulated. Also, when plural accumulators are used (per sensor element), accumulations can be "interleaved", i.e., a first color can be accumulated, then another color can be accumulated, and then the first color can be accumulated again, all without an intervening readout or reset.

For example, to achieve a frame duration of 30 milliseconds (ms) using a single accumulator, the following pattern could be used: 10 ms of red, readout and reset, 10 ms of green, readout and reset, 10 ms of blue, readout and reset, and repeat. If there are moving elements in the scene or object being imaged, there will be an average of about 15 ms of opportunity for color misregistration due to motion in the scene being imaged. The examples described herein reduce this opportunity for color misregistration due to scene motion.

Plural color-dedicated accumulators would permit an interleaving pattern such as 5 ms red, 5 ms green, 5 ms blue, 5 ms red, 5 ms green, 5 ms blue, readout and reset, and repeat. In this case, the average time available for misregistration is reduced by half to about 7.5 ms. The time available for misregistration due to scene movement can be reduced to less than 2 ms by cycling through 1 ms phases for each color. In that case, the average misregistration between colors is limited by the amount of scene movement that occurs with 2 ms. Thus, the interleavings provided for by using plural dedicated color accumulators can readily reduce color misregistration by an order of magnitude or more. Further advantages are attainable when infra-red capabilities are integrated into the camera, as in the following example.

Figure 3:
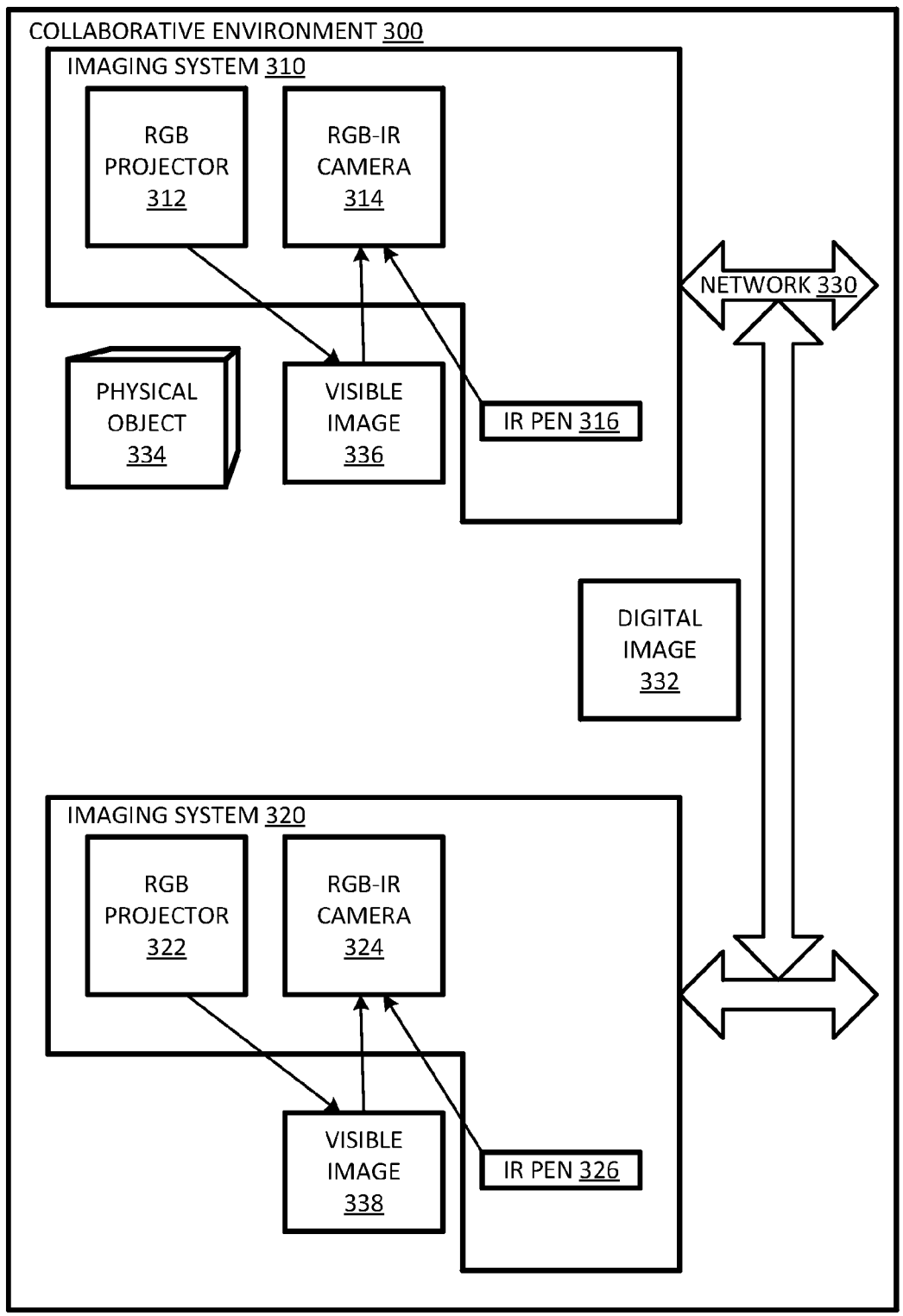
FIG. 3 is a schematic diagram of a collaborative environment in accordance with an example.

A collaborative environment 300 is illustrated schematically in FIG. 3 including imaging systems 310 and 320 coupled by a network 330. While two imaging systems are represented in FIG. 3, other examples include other numbers of imaging systems. Imaging system 310 includes an RGB projector 312, an RGB-IR camera 314, and an IR pen 316. Imaging system 320 is essentially similar to imaging system 310; imaging system 320 includes an RGB projector 322, an RGB-IR camera 324, and an IR pen 326.

Imaging system 310 can be used to generate a machine-readable digital image 332 of a physical object 334 (which can be, for example, a three-dimensional object or a page of a document). To this end, RGB projector 312 can be used to illuminate physical object 334, and RGB-IR camera 314 can capture light reflected by physical object 334 to produce digital image 332. Digital image 332 can then be input to RGB projector 312 so that RGB projector 312 projects (e.g., generates) a human-perceptible visible image 336.

Visible image 336 can serve as a virtual object that can be manipulated/modified by a user, e.g., using IR pen 316 as well as other human-input devices. IR pen 316 is a stylus with a tip that emits IR light; the tip may also emit visible light to let a user known when the IR light is active. A local collaborator (or other user) can use IR pen 316, for example, to control the position of a cursor in visible image 336 and to manipulate or annotate visible image 336 by gesturing or "writing" with IR pen 316. RGB-IR camera 314 detects the position of IR pen 316 so that the position of IR pen 316 can be tracked. Commands can be implemented and cursor position adjusted in digital image 332; as it is updated, digital image 332 can be input to RGB projector 312 to update visible image 336.

In addition to its use locally with respect to imaging system 310, digital image 332 can be communicated over network 330 to imaging system 320. There, digital image 332 can be input to RGB projector 322 to generate visible image 338. Like visible image 336, visible image 338 can be manipulated by a remote collaborator (or other user). e.g., using IR pen 326. RGB-IR camera 324 can track the position of IR pen 326 and update digital image 332. In practice, each imaging system 310, 320 maintains an instance of digital image 332; programs on the imaging systems ensure that both instances are updated so that visible images 336 and 338 are reconciled (i.e., synchronized) in near real time. Thus, local and remote collaborators can work together to dialog about and edit the virtual object represented by visible images 336 and 338.

Collaborative environment 300 and its imaging systems 310 and 320 have some applications and some elements in common with their counterparts disclosed in PCT Patent Application number PCT/US11/58896 entitled "Projection Capture System, Programming And Method". However, imaging systems disclosed in that application used separate cameras for visible colors and for IR. RGB-IR cameras 314 and 324 combine visible color capture and IR capture for simplicity, economy, and better registration of color and IR image components.

Figure 4:
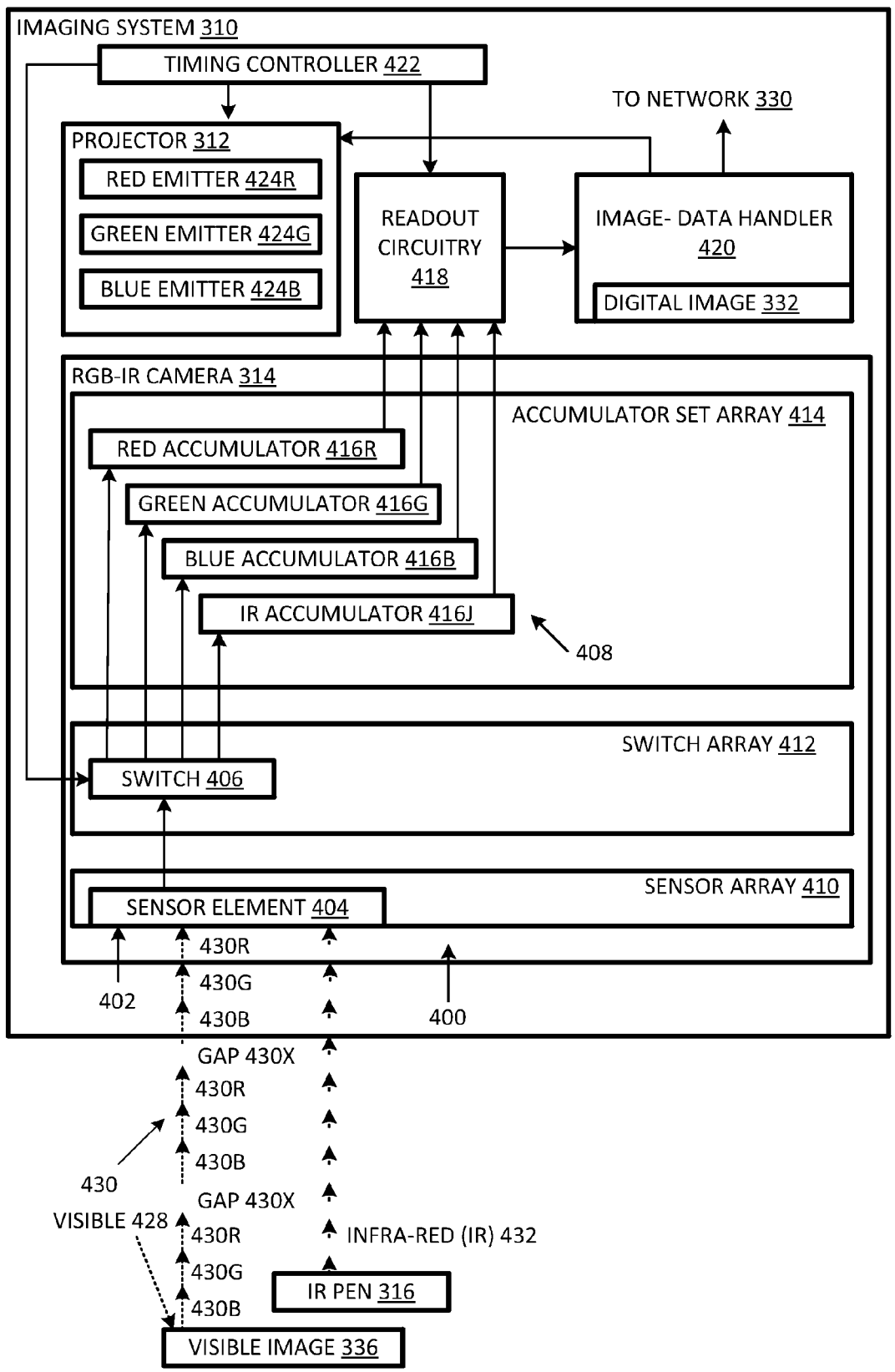
FIG. 4 is a schematic diagram of an imaging system of the collaborative environment of FIG. 3.

RGB-IR camera 314, as shown in FIG. 4, includes a channel array 400 of detection channels 402. Each detection channel 402 includes a respective sensor element 404, a respective switch 406, and a respective accumulator set 408. Accordingly, channel array 400 includes a two-dimensional sensor array 410 of sensor elements 404, a two-dimensional switch array 412 of switches 406, and a two-dimensional accumulator-set array 414 of accumulator sets 408. Sensor array may be formed on the back side of a backside-illuminated CMOS sensor, while switch array 412 and accumulator-set array 414 may be formed on the front side of the backside-illuminated CMOS sensor. Each accumulator set 408 includes plural color-dedicated accumulators 416, in this case, a red-dedicated accumulator 416R, a green-dedicated accumulator 416G, a blue-dedicated accumulator 416B, and an IR-dedicated accumulator 416J. Accumulators 416 can be implemented as integrating capacitors.

Sensor elements 404 are "full-range" in that each sensor element 404 can detect incident red, green, blue, and infra-red light. In response to detection of incident light, e.g., in the form of photons, each sensor element 404 outputs "detections", in this case, in the form of electrical charges. All accumulators 416 are essentially similar; the differing labels reflect the fact that, in use, each accumulator is dedicated to a respective color (e.g., red. green, blue, and infra-red).

Each switch 406 has outputs coupled to inputs of respective accumulators 416 of a respective accumulator set 408. Accumulator outputs are coupled to readout circuitry 418, which includes an analog-to-digital converter (ADC) for converting analog accumulator values to digital values. In other examples, ADCs are located between accumulators and readout circuitry.

The output of readout circuitry 418 is received by an image-data handler 420, e.g., a computer, which can use the received digital data to construct and update digital image 332. Digital image 332 is communicated from image-data handler 420 to RGB projector 312 to update visible image 336. In addition, image-data handler 420 communicates via network 330 with its counterparts in other imaging systems, e.g., imaging system 320, to reconcile (i.e., resolve differences between, synchronize, equalize) instances of digital image 332.

A timing controller 422 controls and synchronizes (i.e., coordinates the timings for) switches 406, readout circuitry 418, and red, green, and blue emitters 424R, 424G, 424B of RGB projector 312. Each switch 406 is synchronized with projector 312 so that, at any given time, detections are routed to the accumulator corresponding to the color being emitted by projector 312. During gaps in emissions by projector 312, IR detections are routed to IR accumulators 416J. Thus detections are routed to accumulators as a function of the color of the incident light from which the detections resulted. Timing controller 422 can include circuitry within RGB projector 312, within RGB-IR camera 314, and/or external to both RGB projector 312 and RGB-IR camera.

Figure 5:
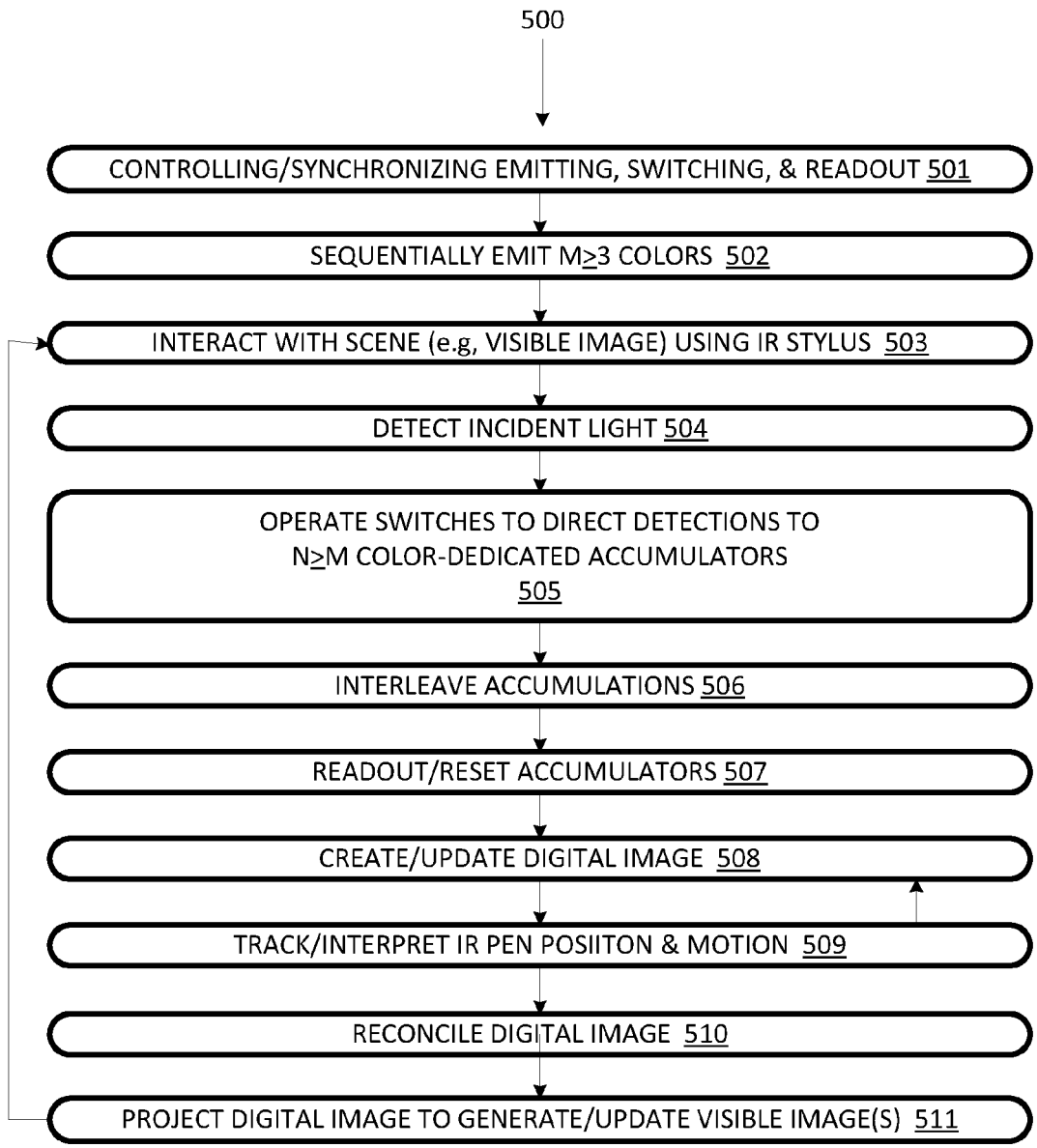
FIG. 5 is a flow chart of a collaborative process in accordance with an example.

An imaging process 500, flow charted in FIG. 5, can be implemented using collaborative environment 300 or another environment. At 501, timings of an imaging system are controlled so that emitting by a projector, switching within a camera, and readout from the camera are synchronized (i.e., their timings are coordinated). In the context of collaborative environment 300, timing controller 422 is configured to synchronize timings used for operation of projector 312, camera switches 408, and readout circuitry 418. For example, while timing controller 422 is causing RGB projector 312 is emitting red, switch 406 is directing (presumably red) detections to red accumulator 416R. For another example, while timing controller 422 is causing RGB projector 312 to not emit any color, timing controller 422 causes switch 406 to direct (presumably IR) detections to IR accumulator 416J. Also, timing controller 422 causes readout circuitry 418 to read out respectively from accumulators 416R, 416G, 416B, and 416J, only while they are not receiving detections.

For example, RGB projector 312 can emit colors sequentially to yield emitted visible light 428, resulting in visible light 430 to be incident to camera 314 due to reflections of emitted visible light 428. Due to control of RGB projector 312 by timing controller 412, incident visible light 430, like emitted visible light 428, can consist of cyclical phases, e.g., a red phase 430R, a green phase 430G, a blue phase 430B, and a gap phase 430X. Switches 406 route detections during red phases 430R to red accumulator 416R, detections during green phases 430G to green accumulator 416G, detections during blue phases 430B to blue accumulator 416B, and detections during gap phases 430X to IR accumulator 416J. The phases can have different durations and frequencies. For example, a pattern RGBXRGBXRGBX, etc., allows the position of IR PEN 316 (which may be moving) to be sampled more frequently than visible image 336 (which may be a stationary document).

At 502, colors are emitted sequentially, i.e., one at a time. For example, the sequence can be RGBRGBRGB . . . in which a sequence RGB is repeated; alternatively, a sequence may not have a repeating pattern. In a case such as imaging system 310 (in which RGB-IR camera 314 detects more colors than RGB projector 312 emits), the pattern can include gaps, e.g., RGBXRGBX or RXGXBXRXGXBX, e.g., to allow a camera to detect light from a different source (such as infra-red from an IR pen). The number m of different colors represented is greater than or equal to three so that a full color image can be obtained by integrating over the different colors. The light emitted over each color phase of each cycle can be uniform (e.g., to illuminate a physical object) or image-bearing (e.g., when projecting an image).

At 503, a collaborator or other entity interacts with a scene using a human interface device such as IR pen 316. The scene can include a physical object, e.g., illuminated by RGB projector 312, and/or a visible image, e.g., projected by projector 312. For example, a collaborator may use IR pen 316 to point to a portion of visible image 336; collaborative environment 300 can then reconcile visible image 338 so that collaborators using imaging systems 310 and 320, respectively, can focus on the same area of the common virtual object. Also, IR pen 316 can be used to annotate a document image (or even a physical object) or issue commands (e.g., "rotate", "zoom", etc.).

At 504, incident light (visible and IR) is detected by sensor array 410, resulting in detections. At 505, switches are operated to direct detections to n≥m color-dedicated accumulations. Switches 406 can be controlled by timing controller 422 in synchronization with RGB projector 312 so that the detections are routed to the accumulator 416R, 416G, 416B, or 416J corresponding to the phase of the incident light causing the detections. For example, while RGB projector 312 is emitting red light, switches 406 are set so that detections are routed to "red" accumulator 416R. For another example, during gaps between color emissions by RGB projector 312, switches 406 are set so that detections are routed to IR accumulator 416J. Note that the color phases can vary in number and/or duration by color. For example, there can be two green cycles or a double-length green cycle to take advantage of the fact that green is perceived as most closely related to intensity (brightness), to which human eyes are more sensitive, than hue.

At 506, accumulations are interleaved. Herein, accumulations are "interleaved" when an accumulation within one accumulator coupled to a switch to receive detections from a sensor includes detections acquired both before and after detections accumulated within another accumulator coupled to the switch to receive detections from the sensor. "Interleaving" can include single-color interleaving, e.g., RGBG, in which only one accumulator (in this case, green accumulator (416G) is interleaved, and all-color interleaving, e.g., RGBRGB in which all accumulations are interleaved. Interleaving is made possible by the presence of dedicated-color accumulators (as opposed to using a single accumulator that must be emptied before it can be used to store detections associated with the next color). As explained below, interleaving makes possible dramatic reductions in problems with color misregistration due to moving elements in a scene.

At 507, accumulations are read out; once its contents have been read, an accumulator is reset (e.g., to zero). For embodiments that do not employ interleaving, accumulators can be read out and reset each color cycle, e.g., RGB, or RGBJ. For embodiments that do employ interleaving, readouts/resets can occur after plural color cycles, e.g., RGBRGB or RGB-JRGBJ (where J can correspond to switch settings in which projector 312 is not emitting a color and detections routed are to IR accumulator 416J.

In some examples, the number of color-phase cycles (e.g., RGBX instances) can be large, e.g., tens or hundreds between readouts so that the accumulations in a set of accumulators are highly overlapped in time so as to minimize misregistration of colors in a digital image (without requiring color registration post processing, which can be time consuming and, thus, delay collaborative image updating). In the course of 507, readout circuitry 418 can convert analog values stored in the accumulators to digital values for use by image-data handler 420.

At 508, a digital image 332 is created/updated based on the data read out from the accumulators. At 509 the image data is interpreted, e.g., by image data handler 420 to track IR pen position and motion. Note that, if the IR pen is to be tracked against a stationary object or projected image, the pen position can be sampled more frequently than the object or projected image. For example, projector 312 can emit repetitions of RXGXBX and detections can be routed with repetitions of the pattern RJGJBJ.

At 510, instances of a digital image at different imaging systems are reconciled. For example, copies of digital image 332 (FIG. 3) stored by respective imaging systems 310 and 320 can be reconciled. At 511, the reconciled digital images can be input to respective projectors to generate/update visible images. Since digital images are reconciled, the visible images generated from them are also reconciled. For example, visible images 336 and 338 (FIG. 3) are reconciled so that collaborators using respective imaging systems 310 and 320 can operate on the same virtual objects.

In other examples, other color sets are used. For example, ultra-violet light may be detected instead of or in addition to infra-red. Detection color phases may be longer and/or more frequent than others. In some examples, there is more than one accumulator per color per sensor. For example, plural IR accumulators can be used to detect phase and thus depth of an IR pen.

In the illustrated examples, m<n, i.e., the number m of emitters in the projector involved in time-sequential emissions is less than or equal to the number n of accumulators per accumulator set, i.e., per sensor channel. For example, three accumulators can be used with a projector that emits three colors (RGB), or four accumulators can be used with a projector that emits four colors (RGB-IR), or four accumulators can be used with a projector that emits three colors (RGB), with the fourth accumulator used to detect IR from a source other than the projector.

In alternative examples, m>n. For example, a projector can have m>n emitters, but limit the number used to n. Thus, a projector may have emitters for R, G, B, IR, and UV, but use only one of IR and UV at a time. For another example, a projector can have six emitters: red, green, blue, magenta, cyan, and yellow, and three accumulators can be used during even cycles for red, green, and blue and during odd cycles for magenta, cyan, and yellow. In the illustrated examples, each accumulator is dedicated to accumulating detections only for a single color (R, G, B, or IR). However, in some examples, e.g., where m>n, the color accumulator by an accumulator may be changed, e.g., for different readout cycles.

Herein, a "system" is a set of interacting non-transitory tangible elements, wherein the elements can be, by way of example and not of limitation, mechanical components, electrical elements, atoms, physical encodings of instructions, and process segments. Herein "device" refers to a hardware or hardware+software system. Herein, "process" refers to a sequence of actions resulting in or involving a physical transformation. An "imaging process" is a process for creating visible and/or digital images.

An "imaging system" is a system that creates visible and/or digital images. Herein, "image" refers to a (uniform or non-uniform) spatial distribution of light or a digital representation of such a distribution of light. A "visible image" is an image that a human can perceive; a "digital image" is a non-transitory tangible encoding of data in digital format that represents a visible image (and may include other data).

Herein, a "virtual object" is a digitally-defined object that represents a human-manipulable object and that can be manipulated by a human as if it were that manipulable object. For example, a projected image of a document can represent a hardcopy document and can be manipulated, e.g., annotated using an IR pen, (more or less) as if it were the hardcopy document.

Herein "light" is electromagnetic radiation. "Light" encompasses "visible light", which consists of light within a wavelength range perceptible to the human eye, and "invisible light", which is light outside the wavelength range perceptible to the human eye and encompasses "infra-red light" and "ultra-violet light". A "sensor" is a hardware device for converting incident light (i.e., light that reaches the sensor) into detections. A "sensor array" is a sensor constituted by an array, typically two-dimensional) of "sensor elements", each of which is a sensor in its own right.

Herein, a "detection" is a tangible entity produced in response to incident light. A detection can be, for example, an electrical charge or an set of electrical charges. Alternatively, a detection can be a voltage level or a light intensity level (where the sensor effectively generates amplified light in response to incident light), or a detection can take another form.

Herein, a "detection accumulator" or just "accumulator" is a device that accumulates or counts detections. For example, an accumulator can be an integrating capacitor that increases its charge level as detections in the form of electrical charges are received. In other examples, an accumulator can take another form such as a counter that counts light pulses generated in response to incident light.

Herein, "switch" refers to a device with an input, plural outputs, and a control port for receiving a signal that selects one of the outputs to be connected to the input. In the present case, a switch input is connected to an output of a sensor element for receiving a detection therefrom; each switch output is coupled to a respective color-dedicated accumulator to, when coupled to the switch input, direct the detection to the respective accumulator; and each control port is coupled to the timing controller so that the switch settings can be synchronized with projector emitters. Herein, "partitioned" means "allocated", in the sense that each detection is allocated to a respective accumulator according to the switch setting at the time the detection is made. Herein, "set" requires at least two elements.

Herein, a "readout system" and "readout subsystem" refer to systems for reading out values from other devices, such as accumulators, e.g., to determine the number or amount of detections accumulated by an accumulator. "Reset" herein refers to initializing a device, e.g., setting an accumulator so that the amount of detections it represents is zero.

Herein, "computer" refers to a hardware machine for processing physically encoded data in accordance with physically encoded instructions. A "server" is a computer that performs services for other computers. Depending on context, reference to a computer or server may or may not include software installed on the computer. Herein, "storage medium" and "storage media" refer to a system including non-transitory tangible material in or on which information is or can be encoded with information including data and instructions. "Computer-readable" refers to storage media in which information is encoded in computer-readable form.

In this specification, related art is discussed for expository purposes. Related art labeled "prior art", if any, is admitted prior art. Related art not labeled "prior art" is not admitted prior art. In the claims, "said" introduces elements for which there is explicit verbatim antecedent basis; "the" introduces elements for which the antecedent basis may be implicit. The illustrated and other described embodiments, as well as modifications thereto and variations thereupon are within the scope of the following claims.

What is claimed is:

1. An imaging system comprising:
    a human interface device to emit infrared light;
    a sensor array of sensor elements to convert incident light to detections;
    detection accumulators;
    switches to couple said detection accumulators to said sensor elements, each switch selectively routing detections from a sensor element so that they are partitioned among n≥3 members of a set of said detection accumulators to yield n concurrent accumulations, wherein one of the n concurrent accumulations corresponds to the infrared light emitted by the human interface device; and
    a readout subsystem to read out said accumulations after they become interleaved such that, at a given instant, a first accumulation in a first accumulator of said charge accumulators includes a first portion and a second portion, and a second accumulator of said charge accumulators includes a third portion accumulated after said first portion and before said second portion.

2. An imaging system as recited in claim 1 further comprising:
    an emitter subsystem to emit m visible colors sequentially; and
    a timing controller to synchronize said switches with the human interface device and said emitter subsystem so that each of said charge accumulators accumulates detections corresponding to at most one of the infrared light and the m visible colors, and so that different ones of said charge accumulators of said set accumulate detections for respective different ones of the infrared light and the m visible colors.

3. An imaging system as recited in claim 2 wherein n≥m.

4. An imaging system as recited in claim 3 further comprising a readout subsystem to read out said accumulations after they become interleaved.

5. An image system as recited in claim 3 wherein n>m.

6. An imaging system as recited in claim 5 wherein said m colors include red, green, and blue, and said n charge accumulators are used for separately storing red, green, blue, and infra-red detections.

7. An imaging system as recited in claim 2 wherein the emitter subsystem is to illuminate a physical object with a visible image to serve as a virtual object.

8. An imaging system as recited in claim 7 wherein the incident light detected by the sensor array of sensor elements comprises reflection of the infrared light and the m visible colors from the physical object.

9. An imaging system as recited in claim 7 wherein the human interface device is manipulated by a user to control the virtual object using the infrared light.

10. An imaging system as recited in claim 7 further comprising an image-data handler to synchronize the virtual object with a second virtual object presented to a remote collaborator.

11. An imaging process comprising:
    emitting infrared light using a human interface;
    detecting incident light using a sensor array of sensor elements to yield detections;
    operating switches to route said detections to detection accumulators so that detections made by a sensor element are partitioned for storage among a set of n≥3 detection accumulators to yield n concurrent accumulations, wherein one of the n concurrent accumulations corresponds to the infrared light emitted by the human interface device; and
    reading out said n concurrent accumulations after they become interleaved such that, at a given instant, a first accumulation in a first accumulator of said charge accumulators includes a first portion and a second portion, and a second accumulator of said charge accumulators includes a third portion accumulated after said first portion and before said second portion.

12. An imaging process as recited in claim 11 further comprising:
    sequentially emitting light of m visible colors with the infrared light; and
    synchronizing said switches with said emitting of the infrared light and the m visible colors so that each of the n concurrent accumulations corresponds to at most one of the infrared light and the at least three visible colors.

13. An imaging process as recited in claim 12 wherein n≥m.

14. An imaging process as recited in claim 13 further comprising reading out said n concurrent accumulations after they become interleaved.

15. An imaging process as recited in claim 13 wherein n>m.

16. An imaging process as recited in claim 15 wherein said m colors include red, green, and blue, and said n charge accumulators are used for separately storing red, green, blue, and infra-red detections.

17. An imaging process as recited in claim 12 wherein the emitting light of m visible colors is to illuminate a physical object with a visible image to serve as a virtual object.

18. An imaging process as recited in claim 17 wherein the incident light detected by the sensor array of sensor elements comprises reflections of the infrared light and the m visible colors from the physical object.

19. An imaging process as recited in claim 17 wherein the human interface device is manipulated by a user to control the virtual object using the infrared light.

20. An imaging process as recited in claim 17 further comprising synchronizing the virtual object with a second virtual object presented to a remote collaborator.

* * * * *

UNITED STATES PATENT AND TRADEMARK OFFICE
CERTIFICATE OF CORRECTION

PATENT NO. : 8,982,261 B2
APPLICATION NO. : 13/651387
DATED : March 17, 2015
INVENTOR(S) : Kurt Eugene Spears et al.

Page 1 of 1

It is certified that error appears in the above-identified patent and that said Letters Patent is hereby corrected as shown below:

In the Drawings

In sheet 4 of 4, reference numeral 509, line 1, delete "POSIITON" and insert -- POSITION --, therefor.

In the Claims

In column 8, line 63, in Claim 5, delete "image" and insert -- imaging --, therefor.

In column 9, line 6, in Claim 8, delete "reflection" and insert -- reflections --, therefor.

Signed and Sealed this
Eleventh Day of August, 2015

Michelle K. Lee
*Director of the United States Patent and Trademark Office*